United States Patent

[11] 3,590,283

[72] Inventors Philip M. Carmody
Roselle Park;
William C. Slemmer, Chatham, both of, N.J.
[21] Appl. No. 824,992
[22] Filed May 15, 1969
[45] Patented June 29, 1971
[73] Assignee Bell Telephone Laboratories, Incorporated
Murray Hill, Berkeley Heights, N.J.

[54] REGENERATIVE SWITCHING CIRCUITS EMPLOYING CHARGE STORAGE DIODES
14 Claims, 3 Drawing Figs.

[52] U.S. Cl. ........ 307/273, 307/281, 307/290, 307/319, 331/111, 331/113 R
[51] Int. Cl. ........ H03k 3/26, H03k 3/33
[50] Field of Search ........ 307/273, 281, 319, 290; 331/111, 113

[56] References Cited
UNITED STATES PATENTS
3,106,644 10/1963 Retzinger, Jr. ........ 307/281 X
3,157,842 11/1964 Hoeks ........ 307/281 X

*Primary Examiner*—Stanley D. Miller, Jr.
*Attorneys*—R. J. Guenther and Kenneth B. Hamlin

ABSTRACT: Diodes having long minority carrier lifetimes are connected between active switching elements in a monostable or astable regenerative switching circuit. When the circuit is in one state, a forward current flows through the diode, and charge is stored near the junction thereof. When the circuit is triggered to its other state, current through the diode is reversed and the diode acts as a voltage clamp to maintain one of the switching elements in a nonconductive state.

INVENTORS P. M. CARMODY
W. C. SLEMMER

BY D. E. Snedeker

ATTORNEY

REGENERATIVE SWITCHING CIRCUITS EMPLOYING CHARGE STORAGE DIODES

BACKGROUND OF THE INVENTION

1. Field of the Invention

This relates to regenerative switching circuits and particularly to regenerative switching circuits which are completely integrable.

2. Description of the Prior Art

Regenerative switching circuits, that is, astable and monostable circuits, are basic building blocks of electronic devices and systems. They are used for digital control and wave-shaping functions in almost every phase of electronics. In line with the current trend toward lighter and less bulky apparatus in the electronics art, it would be advantageous to miniaturize regenerative circuits as much as possible. Because of the necessity for bulky timing capacitors, however, integration of this type of circuit has proved difficult.

SUMMARY OF THE INVENTION

Accordingly, it is an object of this invention to provide regenerative switching circuits which are totally integrated.

It is another object of this invention to eliminate timing capacitors from regenerative switching circuits.

These and other objects are achieved in three illustrative regenerative switching circuits containing charge storage diodes, that is, diodes having long minority carrier lifetimes, connected between two active switching elements. With two of the circuits, a Schmitt trigger and a monostable circuit, when the circuit is in its first condition a current flows through the diode in the forward direction and the diode stores charge. When the circuit is triggered to its other state, the diode acts as a voltage clamp until the stored charge is exhausted, and thereby maintains one of the switching elements momentarily nonconductive. In the third circuit, an astable circuit, two charge storage diodes are connected to cross couple the active switching elements. As the circuit alternates between its two conditions, the charge storage diodes alternately store charge and act as voltage clamps to maintain one or the other of the switching elements nonconductive.

BRIEF DESCRIPTION OF THE DRAWING

The objects and advantages of this invention may be better understood by reference to the following detailed description and the accompanying drawing in which.

DETAILED DESCRIPTION

Figure 1:
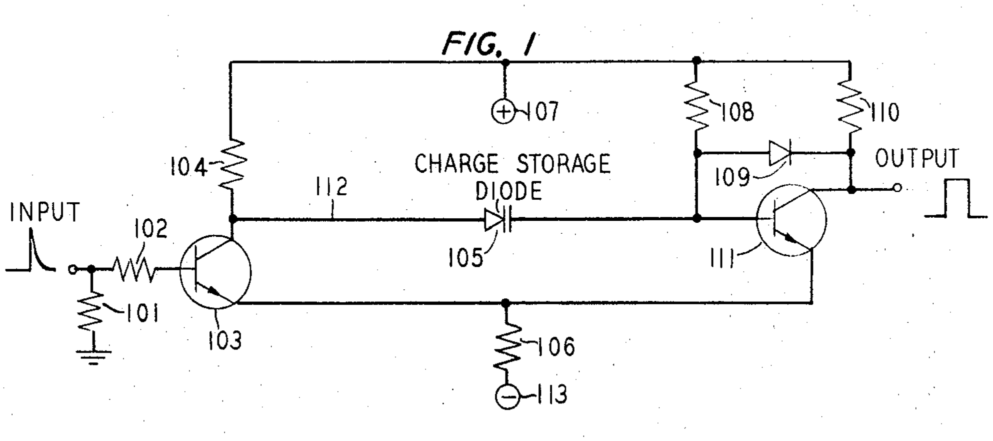
FIG. 1 is a resetting Schmitt trigger circuit constructed in accordance with the invention.

The resetting Schmitt trigger circuit shown in FIG. 1 comprises two switching transistors, transistor 103 and transistor 111, which are connected in parallel between positive source 107 and negative source 113. The input terminal is connected through resistor 101 to ground and through resistor 102 to the base of transistor 103. The collector of transistor 103 is connected through resistor 104 to positive source 107 and the emitter of transistor 103 is connected through resistor 106 to negative source 113. The collector of transistor 111 is connected to the output terminal and also through resistor 110 to positive source 107. The emitter of transistor 111 is connected through resistor 106 to negative source 113.

Conduction path 112, including charge storage diode 105, is connected between the collector of transistor 103 and the base of transistor 111, charge storage diode 105 being poled toward the base of transistor 111. Charge storage diode 105 is any one of a variety of diodes which are characterized by long minority carrier lifetimes and which store a significant amount of charge near their PN junctions while conducting a forward current. It is a further characteristic of charge storage diodes that after they are charged they will conduct a reverse current for a predetermined period of time. During this period they provide a substantially constant forward voltage output, illustratively on the order of 0.7 volt.

To conclude the structure of FIG. 1, resistor 108 is connected between positive source 107 and the base of transistor 111. Diode 109, which is illustratively a Schottky-barrier diode, is used as an antisaturation clamp between the base and collector of transistor 111.

The circuit shown in FIG. 1 operates in the following manner. The values of positive source 107, negative source 113, and resistors 104, 106, and 108 are selected such that transistor 111 is normally conducting, thereby permitting current to flow in the path from positive source 107 through resistors 110 and 106 to negative source 113. In the illustrative embodiment of FIG. 1 the emitter of transistor 111 is at ground level, but it will be apparent that it could easily be placed at any other threshold level. At the quiescent level of the input signal, transistor 103 is maintained nonconducting.

In this stable state, a current flows from positive source 107 through resistor 104 and through conduction path 112 and charge storage diode 105 to the base of transistor 111. From transistor 111 this current proceeds through resistor 106 to negative source 113. In the presence of this forward current, as described above, charge storage diode 105 stores charge.

When the voltage at the input terminal is increased beyond a threshold level, illustratively 0.7 volt above the emitter voltage of transistor 103, transistor 103 becomes conductive. Transistor 103 then conducts a current through the path from positive source 107, resistor 104, and resistor 106 to negative source 113. With transistor 103 conducting, the voltage at the collector of transistor 103 falls to such an extent that a reverse current flows through charge storage diode 105. This current follows a path from positive source 107 through resistor 108, charge storage diode 105, transistor 103, and resistor 106, to negative source 113.

Charge storage diode 105 continues to conduct a current in the reverse direction until the charge previously stored therein by a forward current is exhausted. During this period of reverse conduction, charge storage diode 105 provides a constant voltage output of approximately 0.7 volt. Thus, it in effect "clamps" the base of transistor 111 to a voltage 0.7 volt below the collector of transistor 103. With the circuit values chosen as in FIG. 1, this clamping action renders transistor 111 nonconductive and thus increases the voltage at the output terminal to a level representative of the astable state of the circuit.

This circuit exhibits the hysteresis properties characteristic of Schmitt trigger circuits in general. Thus, if the input voltage is reduced to a level below the threshold level at which transistor 103 becomes conductive, the circuit is not necessarily switched back to its stable state. Triggering of the circuit back to its stable state is accomplished only by reducing the input voltage to a cutoff level considerably below the threshold level such that transistor 103 is switched to a nonconductive state.

Assuming that the input voltage is maintained below the threshold level and above the cutoff level, the circuit remains in its astable state, that is, with transistor 103 conducting and transistor 111 nonconducting, until the charge stored in diode 105 is exhausted by the reverse current therethrough. When this occurs, the voltage at the base of transistor 111 increases and transistor 111 is rendered conductive by a base current flowing from source 107 through resistor 108. Transistor 111 thus conducts current again through resistor 110 and resistor 106 in the conduction path described previously.

When transistor 111 becomes conductive, the voltage at the emitter of transistor 103 increases, and transistor 103 becomes nonconductive. Thus the circuit is returned to its stable condition with transistor 103 nonconducting, transistor 111 conducting and a forward current flowing through the charge storage diode 105. The voltage at the output terminal falls to its previous level, as determined by the voltage across resistor 110.

Figure 2:
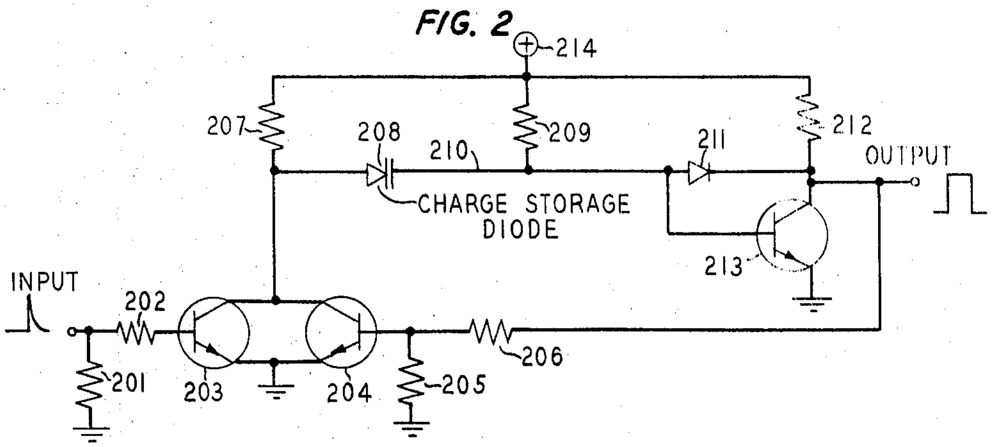
FIG. 2 is a monostable circuit constructed in accordance with the invention.

FIG. 2 shows another monostable circuit constructed in accordance with the principles of the invention. It will be noted that this embodiment is similar to the Schmitt trigger circuit of FIG. 1 except that both coupling paths between the transistors extend from collector to base. The triggering circuit for this monostable circuit comprises an input terminal which is connected through resistor 201 to ground and through resistor 202 to the base of transistor 203. The collector and emitter, respectively, of transistor 203 are joined with the collector and emitter of transistor 204, and the emitters are grounded. The collectors of transistors 203 and 204 are connected in common via resistor 207 to positive source 214. Transistor 213 is connected via its emitter to ground and via its collector to the output terminal. In addition, the collector of transistor 213 is connected through resistor 212 to positive source 214.

Conduction path 210, containing charge storage diode 208, is connected between the collector of transistor 204 and the base of transistor 213, charge storage diode 208 being poled toward the base of transistor 213. Antisaturation diode 211 is connected between the base and collector of transistor 213. Resistor 209 is connected as shown between the base of transistor 213 and positive source 214.

Coupling between switching transistors 204 and 213 is provided over a conduction path containing resistor 206 connected between the base of transistor 204 and the collector of transistor 213. The base of transistor 204 is connected through resistor 205 to ground.

During operation of this circuit, transistor 213 is normally conductive and transistors 203 and 204 are normally nonconductive. A current flows from positive source 214 through resistor 212 and transistor 213 to ground, and accordingly the voltage at the output terminal is maintained at a level near ground. Another current flows from positive source 214 through resistor 207 and charge storage diode 208 to the base of transistor 213, and thus, as described above, charge is stored in charge storage diode 208.

To trigger the circuit to its astable state a positive pulse is applied at the input terminal. Transistor 203 then begins to conduct and the voltage at the collector of transistor 203 decreases as a result of the additional current flowing through resistor 207. This voltage decrease causes a reverse current to flow through charge storage diode 208, which is fully charged as a result of the previous forward current therethrough, and through resistor 209. Thus, charge storage diode 208 conducts a reverse current and holds the base of transistor 213 approximately 0.7 volt below the common collectors of transistors 203 and 204. Accordingly, the voltage at the base of transistor 213 decreases and transistor 213 ceases conduction. With transistor 213 nonconductive, current flow through resistor 212 ceases and the voltage at the output terminal increases to a higher level representative of the astable state of the circuit. The increased voltage at the output terminal is coupled via resistor 206 to the base of transistor 204. Transistor 204 begins to conduct current and remains in a conductive state until the charge stored in charge storage diode 208 is depleted.

Regardless of whether the trigger pulse is removed from the input terminal, the circuit remains in its astable state until the charge stored in charge storage diode 208 is depleted. When that happens, the voltage clamping action of charge storage diode 208 ceases and the voltage at the base of transistor 213 increases. The transistor 213 thus begins to conduct current again and the voltage at the output terminal falls back to its original level. This decrease in voltage is coupled via resistor 206 to the base of transistor 204, thereby blocking conduction through transistor 204. Since transistor 203 is rendered nonconductive when the trigger pulse at the input terminal is terminated, the circuit is back in its stable condition with transistors 203 and 204 nonconducting and transistor 213 conducting.

It is noted that this circuit returns to its stable state when the charge stored in diode 208 is depleted, regardless of whether the input pulse is still present at the input terminal. Thus, the output is entirely independent of the duration of the input pulse, and the circuit can be used advantageously as a pulse standardization device.

Figure 3:
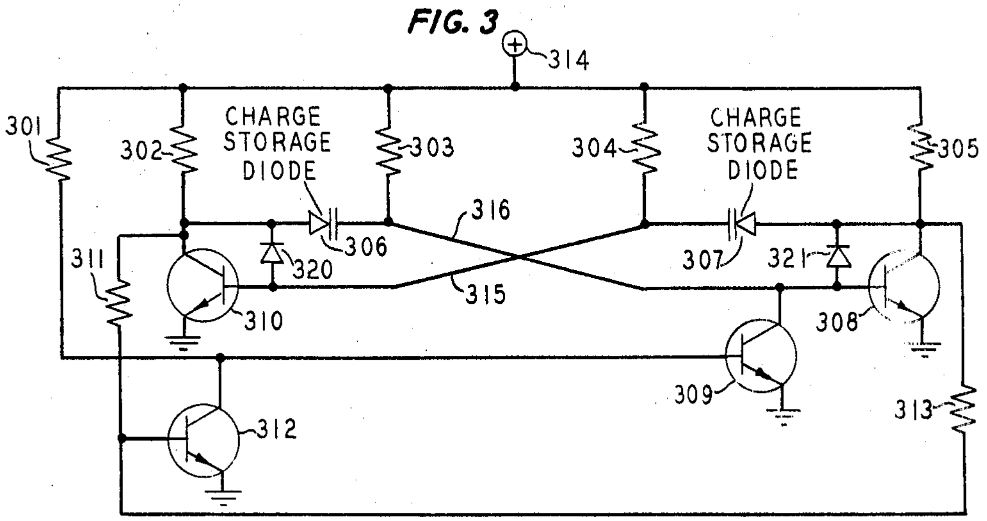
FIG. 3 is a self-starting astable circuit constructed in accordance with the invention.

A self-starting astable circuit according to the principles of the present invention is shown in FIG. 3. The astable circuit includes transistor 310 connected through its collector via resistor 302 to positive source 314 and transistor 308 which is connected through its collector via resistor 305 to positive source 314. The emitters of transistors 310 and 308 are connected to ground. Coupling between transistors 310 and 308 is provided via conduction paths 315 and 316. Conduction path 315 extends from the collector of transistor 308 to the base of transistor 310 and contains charge storage diode 307, which is poled in the direction of transistor 310. Conduction path 316 extends from the collector of transistor 310 to the base of transistor 308 and contains charge storage diode 306, which is poled in the direction of transistor 308. Also connected between positive source 314 and the bases of transistors 308 and 310, respectively, are resistors 303 and 304. Respective antisaturation diodes 320 and 321 are connected between the collector and base of transistors 310 and 308.

The remaining portion of FIG. 3 includes a self-starting circuit for the astable circuit described above. Transistor 309 is connected through its collector to the base of transistor 308 and through its emitter to ground. The base of transistor 309 is connected via resistor 301 to positive source 314. Transistor 312 is connected through its collector to the base of transistor 309 and through its emitter to ground. The base of transistor 312 is connected via resistor 311 to the collector of transistor 310 and via resistor 313 to the collector of transistor 308.

The astable circuit operates in the following manner, with transistors 308 and 310 alternating in conductive states. Initially, after operation of the self-starting circuit as described below, transistor 308 is conducting and transistor 310 is not conducting. A Current flows from positive source 314 through resistor 302 and in the forward direction through charge storage diode 306 to the base of transistor 308. Thus charge is accumulated in charge storage diode 306. Charge storage diode 307 having been previously charged during the starting operation, as described below, another current flows from positive source 314 through resistor 304 and in the reverse direction through charge storage diode 307 to the collector of transistor 308. Transistor 310 is maintained in a nonconducting state by the clamping action of charge storage diode 307, which provides a voltage difference of approximately 0.7 volt while it conducts in the reverse direction.

The astable circuit remains in this state until the charge accumulated in charge storage diode 307 is depleted. Charge storage diode 307 then provides in effect an open circuit between the collector of transistor 308 and the base of transistor 310. The voltage at the base of transistor 310 then increases until transistor 310 begins conducting a current from positive source 314 through resistor 304 to the base of transistor 310. A current also flows from positive source 314 through resistor 302 and transistor 310 to ground. This reduces the voltage at the collector of transistor 310 and, as a result, a reverse current flows through charge storage diode 306 from positive source 314 via resistor 303. This can occur, of course, because previously charge has been accumulated in charge storage diode 306, thus permitting conduction in the reverse direction for a predetermined period of time. Charge storage diode 306 accordingly acts like a voltage clamp and turns transistor 308 to a nonconducting state via the base thereof. With transistor 310 conducting and transistor 308 nonconducting the circuit is in its second astable state.

The second astable state lasts until the charge accumulated in charge storage diode 306 is depleted and reverse conduction therethrough is blocked. At this time, in a manner similar to that described above, transistor 308 is turned to a conducting state, a reverse current flows through charge storage diode 307 and transistor 310 is turned to a nonconducting state. Thus the circuit is returned to its first astable state and remains in this state until reverse conduction through charge storage diode 307 is again blocked, and the process is repeated.

The operation of the astable circuit in FIG. 3 is initiated by preventing conduction through one of the transistors 308 and 310. This is accomplished readily by grounding the base of one transistor momentarily. Alternatively, a self-starting circuit such as the one shown illustratively in FIG. 3 can be connected to the astable circuit. The illustrative self-starting circuit operates as follows. A current flows from positive source 314 through resistor 301 to the base of transistor 309, and transistor 309 is turned to a conductive state. This maintains transistor 308 in a nonconductive state while transistor 310 conducts respective currents from positive source 314 through resistors 302 and 304. In addition a current flows through resistor 305 and charge storage diode 307, thus causing charge to be stored therein. A portion of the current flowing through resistor 305 is diverted at the collector of transistor 308 and flows through resistors 313 and 311 and through transistor 310 to ground. Resistors 311 and 313 are selected such that they act as a voltage divider and thereby turn transistor 312 to a conducting state. Accordingly, transistor 309 is turned to a nonconducting state and transistor 312 remains permanently in a conducting state. With transistor 309 nonconducting, transistor 308 is permitted to conduct current and the astable operation of the circuit proceeds in the manner described above.

The circuits shown in each of FIGS. 1, 2 and 3 contain basically two switching elements (respectively transistors 103 and 111 in FIG. 1, transistors 204 and 213 in FIG. 2, and transistors 310 and 308 in FIG. 3) which are linked by a charge storage diode, that is, a diode characterized by a long minority carrier lifetime. Generally, the switching elements alternate states of conduction, and the charge storage diode performs a timing function as charge is repeatedly accumulated and depleted therein. While a reverse current flows through the charge storage diode prior to charge depletion, the circuit is in its astable condition and the charge storage diode acts as a voltage clamp maintaining one of the switching elements in a nonconducting condition. Of course, with respect to FIG. 3, both states of the circuit are astable and accordingly two charge storage diodes are required to provide the timing and switching function.

While in the specific embodiments described herein charge storage diodes have been used to provide charge storage, it is apparent that any semiconductor element having a PN junction capable of storing charge could also be used for the same purpose.

I claim:

1. A regenerative circuit having first and second states comprising first and second switching means and a diode characterized by a long minority carrier lifetime connected between said first and second switching means, said diode storing charge when said circuit is in said first state and acting as a voltage clamp throughout said second state so as to render said second switching means nonconductive.

2. A regenerative circuit as in claim 1 wherein said first and second means comprise respectively first and second conduction paths and first and second transistors respectively connected in said first and second conduction paths, and additionally comprising a voltage source connected in common to said first and second conduction paths.

3. A regenerative circuit as in claim 2 comprising means for supplying a reverse current to said diode when said circuit is in said second state.

4. A regenerative circuit as in claim 3 wherein said means for supplying a reverse current to said diode comprises a conduction path connected between said voltage source and said diode.

5. A regenerative circuit as in claim 4 wherein said diode is connected between the collector of said first transistor and the base of said second transistor, said diode being poled in the direction of said second transistor.

6. A regenerative circuit as in claim 5 comprising an input terminal connected to the base of said first transistor and an output terminal connected to the collector of said second transistor.

7. A regenerative circuit as in claim 6 wherein the emitters of said first and second transistors are connected via said first and second conduction paths.

8. A regenerative circuit as in claim 5 comprising a third transistor, the collector and emitter of said third transistor being connected respectively to the collector and emitter of said first transistor, an input terminal connected to the base of said third transistor, and an output terminal connected to the collector of said second transistor.

9. A regenerative circuit as in claim 8 comprising a conduction path connecting the base of said first transistor and the collector of said second transistor.

10. A regenerative circuit as in claim 1 comprising an additional diode characterized by a long minority carrier lifetime connected between said first and second switching means, said diode storing charge when said circuit is in said second state and acting as a voltage clamp throughout said first state so as to render said first switching means nonconductive.

11. A regenerative circuit as in claim 10 comprising means for supplying a reverse current to said diode when said circuit is in said second state and for supplying a reverse current to said additional diode when said circuit is in said first state.

12. A regenerative circuit as in claim 11 wherein said reverse current supplying means comprises a voltage source and means connecting said voltage source to said diode and to said additional diode.

13. A regenerative circuit as in claim 12 wherein said first and second switching means comprise first and second transistors, respectively, wherein said diode is connected between the collector of said first transistor and the base of said second transistor, said diode being poled in the direction of said second transistor, and wherein said additional diode is connected between the collector of said second transistor and the base of said first transistor, said additional diode being poled in the direction of said first transistor.

14. A regenerative circuit as in claim 13 comprising a self-starting circuit for grounding the base of said second transistor momentarily so as to place said circuit initially in said second state.